March 22, 1927.

J. A. MILLS

AGRICULTURAL IMPLEMENT

Filed Aug. 21, 1926

1,621,993

J. A. Mills
INVENTOR.

BY G. C. Waldrop
ATTORNEY.

Patented Mar. 22, 1927.

1,621,993

UNITED STATES PATENT OFFICE.

JOHN A. MILLS, OF LANCASTER, TEXAS.

AGRICULTURAL IMPLEMENT.

Application filed August 21, 1926. Serial No. 130,743.

This invention relates to agricultural implements and it refers more particularly to an implement especially designed for the purpose of cultivating cotton and similar vegetation by plowing the fields in an intercrossing manner, to rid the same of all undesirable weeds and foreign growth, and the principal object of the invention resides in the provision of a multiplicity of plows, the shanks of which are constructed to be individually yieldable to any obstacle against which it may come in contact during transportation of the implement over the field.

Another object of the invention lies in the provision of a separate control lever, by which it is made possible to elevate alternate plows without affecting the others, and as a consequence, a greater space between the operative plows is obtained, either to permit passage of obstructions, or to provide for scanty vegetation.

With these principal objects in view, the invention consists further in several lesser objects, as well as its salient features of construction and arrangement of parts, which will become apparent as the description proceeds, taken in connection with the accompanying drawings, wherein.

Figure 1:
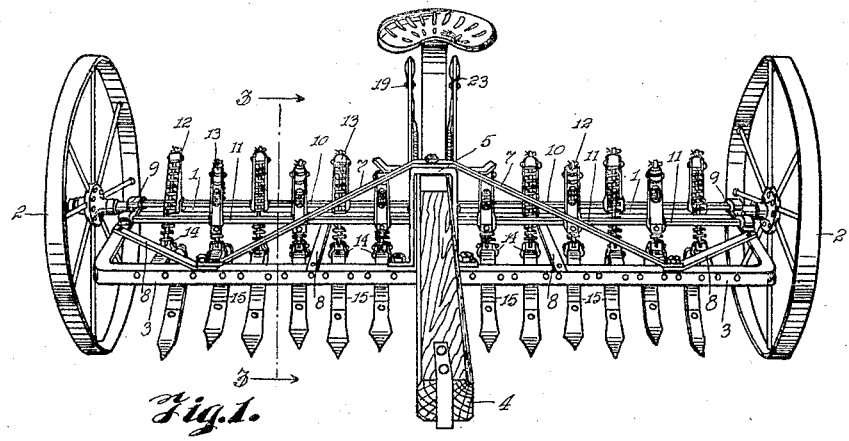
Figure 1 represents a front elevational view of the invention.
Figure 2:
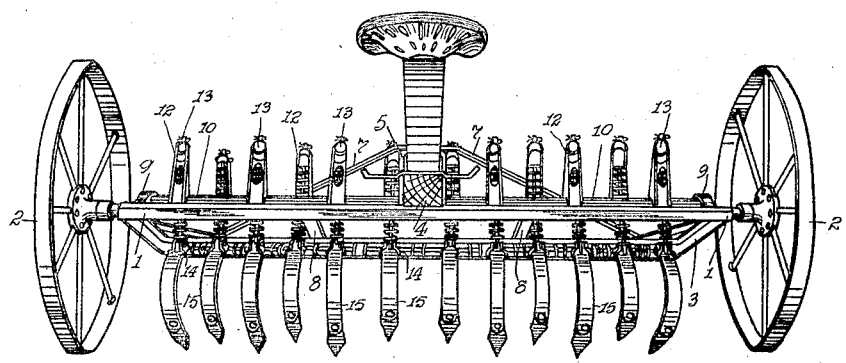
Figure 2 is a rear elevation thereof.

It may be stated in continuing with the invention that it is known to be a well established precedent to plow vegetation in a cross-wise manner to eliminate foreign growth intermediate the stalks and to thus obviate constant hoeing, and it is further known that for this purpose various kinds and types of plows have been contrived, some of which constituted a multiplicity of alined plows. While the present invention seeks the same results, and is possessed of some of the elements of which previous machines are composed, its principal objects are directed toward an improved structure, by which is made possible in an economical manner, independent operation of its plows, hence materially adding to the life of such an implement.

With the foregoing in view the invention primarily includes an axle 1, supporting at either end wheels 2, and adjacent to either end of this axle is bolted or otherwise affixed a U-shaped angle iron frame 3. At approximately the center of the axle, a tongue 4 is affixed, which extends forwardly across the frame 3, and to which the said frame is adjustably secured by a brace 5, bolted to the frame and extending upwardly so as to embrace the tongue. The adjustable feature is made possible, to raise and lower the tongue with respect to the frame by passing a bolt through one of the series of holes 6 in the brace 5, including the tongue. To the forward portion of either end of the frame 3 is affixed the ends of a strap 7, which passes over the brace 5 and to which it is securely bolted, to steady the frame, aided by short braces 8 of any suitable design.

Upon the lateral portions of the frame 3, a pair of bearings 9 are mounted, rotatably supporting the ends of preferably square shafts 10 and 11. These shafts extend unrestrictedly the full length of the frame 3.

Figure 3:
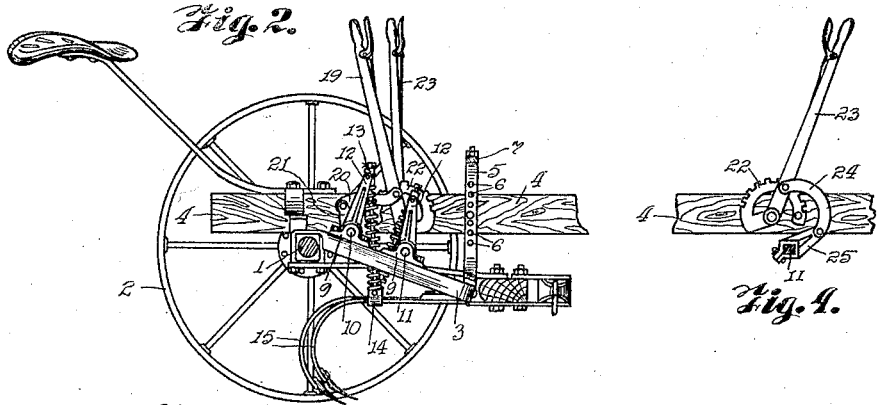
Figure 3 is a side elevational view on lines 3—3 of Figure 1.
Figure 5:
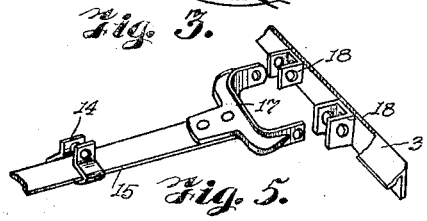
Figure 5 is a detail view of the connection between one of the plow shanks and the implement frame.

Arranged in staggered relationship upon the shafts 10 and 11 are a multiplicity of arms 12, the form of engagement being clearly exemplified in Figure 3. Particular observance to Figure 3 will disclose that a small sleeve 13 is pivotally carried at the ends of each of these arms and through which a rod passes, the latter being pivotally connected to a clamp 14, one of which surrounds each of a like number of curved shanks 15. A coil spring 16 surrounds each of the rods aforesaid and bears against the sleeves 13, thus lending resiliency to the shanks 15, which, as apparent in Figure 5, are provided with a bifurcated end 17, pivotally engaging protruding ears 18, carried interiorly of the angle iron frame. The shanks 15 are composed preferably of material possessed of some resiliency such as spring steel and this, together with the yielding pressure of the coil springs 16, enables the plows to overcome obstacles without probable breakage.

A particularly important point resides in the slidable relationship of the clamp 14 with respect to the shanks 15, thus enabling a slight adjustment as to the raising and lowering of the shanks. After adjusting, the clips may be securely tightened.

Figure 4:
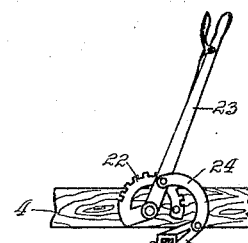
Figure 4 represents a fragmentary view of the implement tongue on which is shown one of the plow actuating levers.

It is evident from the foregoing that each of the square shafts 10 and 11 are independent with respect one to another, this being the case alternate ones of the shanks 15 will be controlled by the shaft to which it is operatively connected. For the purpose of operating the shaft 10, a lever 19 is provided, connected by a link 20, as in Figure 3, to a short extension 21 on the shaft. The lever is further provided with the conventional quadrant 22. A similar arrangement is provided on the opposite side of the tongue 4, consisting of a lever 23, a curved link 24 and an extension 25, a detail of which is shown in Figure 4.

It is clearly obvious from the foregoing that breakage of any one of the shanks 15 by violent control against an obstacle while plowing is improbable since individual yieldability is provided in each. Moreover, as stated previously, a very practical and simple mechanism for elevating alternately situated plows is provided by the invention, which is extremely useful when circumstances require it.

Manifestly, the structure described is capable of some modification, and such modification as is within the scope of the following claims, is considered within the spirit of the present invention.

I claim:

1. In an implement of the character described including with a wheeled frame having a tongue; a brace connected to the forward portion of said frame and adjustably embracing said tongue; a multiplicity of staggeringly arranged plow shanks pivotally connected with the forward portion of said frame and capable of vertical movement; a pair of shafts mounted in parallel relationship on said frame, flexible means carried by said shafts to depend and engage alternate ones of said plow shanks, and means to cause rotation of said shafts independently to elevate alternately arranged plow shanks.

2. In an implement of the character described including in combination with a wheeled frame, a tongue; means for adjustably moving said frame vertically with respect to said tongue; a multiplicity of plow carrying shanks in substantially alined relationship, the forward ends of which are bifurcated and arranged to pivotally join the forward portion of said frame; a clamp slidably carried by each of said shanks; shafts arranged longitudinally of said frame; arms staggeringly carried by said shafts having operative engagement with said clamps; means to provide for limited resiliency intermediate said shanks and arms, and means to cause selective rotation of said shafts to elevate alternate ones of said shanks.

3. In an implement of the character described including in combination with a wheeled frame; a series of plow bearing shanks having their ends horizontally alined in vertically pivotal relationship with respect to the forward portion of said frame; an adjustable clamp carried by each of said shanks; parallel shafts having their opposing ends rotatable in bearings fixed to either end of said frame; arms alternately arranged in staggered relationship on said shafts and having operative connection with the clamps carried by said shanks; means to provide for limited resiliency between said arms and shanks, and independent means to cause selective rotation of said shafts to elevate alternate ones of said shanks simultaneously.

In testimony whereof I affix my signature.

JOHN A. MILLS.